United States Patent [19]

Anterni

[11] Patent Number: 5,369,906
[45] Date of Patent: Dec. 6, 1994

[54] FISHING LURE ASSEMBLY WITH INTERCHANGEABLE HEAD PORTIONS

[76] Inventor: John J. Anterni, 40 Holland Ave., Riverside, R.I. 02915

[21] Appl. No.: 164,455

[22] Filed: Dec. 9, 1993

[51] Int. Cl.⁵ ............................................ A01K 91/00
[52] U.S. Cl. .................................. 43/42.09; 43/42.48
[58] Field of Search ................ 43/42.09, 42.22, 42.45, 43/42.48

[56] References Cited

U.S. PATENT DOCUMENTS

| | | | |
|---|---|---|---|
| D. 147,101 | 7/1947 | Adams | 43/42.45 |
| 1,288,118 | 12/1918 | Morian . | |
| 1,854,696 | 4/1932 | Herington | 43/42.48 |
| 1,867,458 | 7/1932 | Keuper . | |
| 2,278,876 | 4/1942 | Hart | 43/42.09 |
| 2,295,292 | 9/1942 | Rogers . | |
| 2,625,767 | 1/1953 | Pokras | 43/42.09 |
| 2,940,208 | 6/1960 | Oswald | 43/42.09 |
| 2,994,982 | 8/1961 | Murawski . | |
| 3,009,279 | 11/1961 | Jacobson | 43/42.09 |
| 3,108,390 | 10/1963 | Knight | 43/42.22 |
| 5,197,220 | 3/1993 | Gibbs et al. . | |

Primary Examiner—P. Austin Bradley
Assistant Examiner—James Miner
Attorney, Agent, or Firm—Salter & Michaelson

[57] ABSTRACT

A fishing lure assembly includes a body portion having a head end, and a cylindrical neck extending outwardly from the head end. The lure assembly further includes a removable head portion having a cylindrical bore in a first end thereof, and a contoured surface at an opposite second end thereof. The neck of the body has a bayonet slot formed therein. The neck further has a leader eyelet extending outwardly therefrom for attachment of a fishing line. The cylindrical bore of the head portion has a rib element which extends radially inwardly into the bore at the outer end thereof. An inner end of the bore includes a slotted aperture. The neck of the body portion is slidably received into the bore in head portion wherein the rib element is slidably received into the bayonet slot and the leader eyelet extends through the elongated aperture in the inner end of the bore so as to extend outwardly from the second end of the head portion. The head portion is rotatable with respect to the neck portion for releasably engaging the head portion and the body portion in assembled relation wherein the rib element is rotated into locking engagement with the bayonet slot. The lure assembly is provided with a plurality of different interchangeable head portions, each having different contoured end surfaces for creating different types of movement of the fishing lure when it is moved through the water.

4 Claims, 3 Drawing Sheets

FISHING LURE ASSEMBLY WITH INTERCHANGEABLE HEAD PORTIONS

BACKGROUND OF THE INVENTION

The instant invention relates to fishing apparatus and more particularly to a fishing lure assembly with a plurality of interchangeable head portions.

Fishing lures with interchangeable or removable head or body portions have heretofore been known in the art. For example, the U.S. Patents to Gibbs et al U.S. Pat. No. 5,197,220; Keuper U.S. Pat No. 1,867,458; Murawski U.S. Pat. No. 2,994,982; Rogers U.S. Pat. No. 2,295,292; and Morian U.S. Pat. No. 1,288,118 represent the closest prior art to the subject invention of which the applicant is aware.

The Patent to Gibbs et al discloses a multi-part fishing tackle including a first tackle member, such as a sinker or lure body, that can be removed from a fishing line and replaced by another tackle member of different size, shape, or color, etc. without untying or severing the fishing line. The Patents to Keuper, Murawski, Rogers and Morian all provide for the removal of the head portion of the lure from the body portion thereof. In the Morian patent, heads of different designs may be mounted on the body, thereby eliminating the number of treble hooks to be carried by the fisherman. Murawski discloses a head portion which is detachably connected to a hollow body portion by a screw connection, and permits the addition of water or weighting elements to the body portion for varying the weight of the lure. The detachable head includes mounting means for accepting different miniature baits. The head section in the Keuper patent has surface ornamentation thereon, and other head sections having other formations may be substituted therefor. The Keuper patent also provides for removal of the tail section of the lure. In the Rogers patent, a plurality of different head and body portion may be interchanged.

It is pointed out that in each of the above-referenced patents, the leader eyelet of the lure is attached to the head portion and the head portion is releasably connected to the body portion. While this type of arrangement is convenient in that it allows quick assembly and disassembly, it has been found that the body portion sometimes becomes detached from the head portion during use and becomes lost in the water.

SUMMARY OF THE INVENTION

The instant invention provides a fishing lure assembly having a removable head portion wherein the leader eyelet is permanently attached to the body portion and extends through the removable head portion. Briefly, the instant fishing lure assembly comprises a body portion having a head end, a tail end and a cylindrical neck extending outwardly from the head end. The fishing lure assembly further includes a removable head portion having a cylindrical bore in a first end thereof, and a contoured end surface at an opposite second end thereof. The neck of the body portion has a bayonet slot formed therein and the bayonet slot has a perpendicular lock portion adjacent the body portion. The neck further has a leader eyelet extending outwardly therefrom for attachment of a fishing line. The outer end of the cylindrical bore in the head portion has a rib element which extends radially inwardly into the bore. An inner end of the bore has an elongated aperture therein. For assembly, the neck of the body portion is slidably received into the bore in head portion wherein the rib element is slidably received into the bayonet slot and the leader eyelet extends through the elongated aperture in the inner end of the bore so as to extend outwardly from the contoured second end of the head portion. The head portion is rotatable with respect to the neck for releasably engaging the head portion and the body portion in assembled relation, wherein the rib element is rotated into locking engagement with the bayonet slot. The lure assembly is provided with a plurality of different interchangeable head portions having different contoured end surfaces for creating different types of movement of the fishing lure when it is moved through the water.

Accordingly, it is an object of the instant invention to provide a fishing lure assembly having a removable head portion wherein the leader eyelet extends through the head portion and is permanently attached to the body portion.

It is another object to provide a fishing lure assembly having a plurality of interchangeable head portions.

It is still another object to provide a plurality of different head portions of a fishing lure assembly wherein each head portion has a different a contoured end surface for creating a different type of movement of the lure when it is moved through the water.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 8:
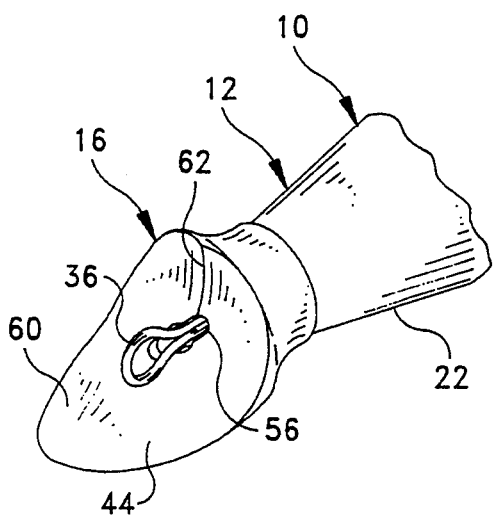
FIGS. 8 through 10 are fragmented perspective views of the body portion with second, third and fourth head portions mounted thereon.
Figure 9:
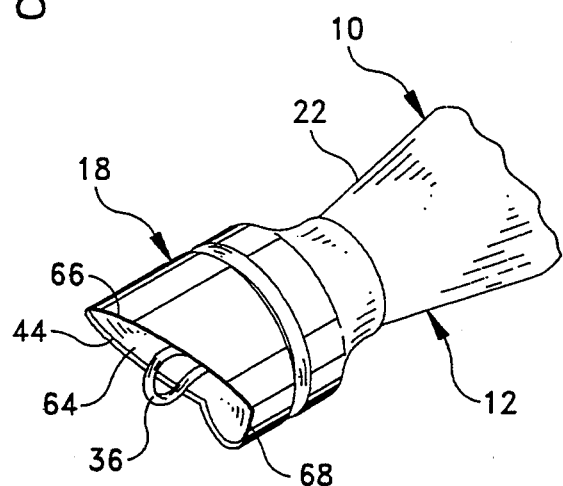
Figure 10:
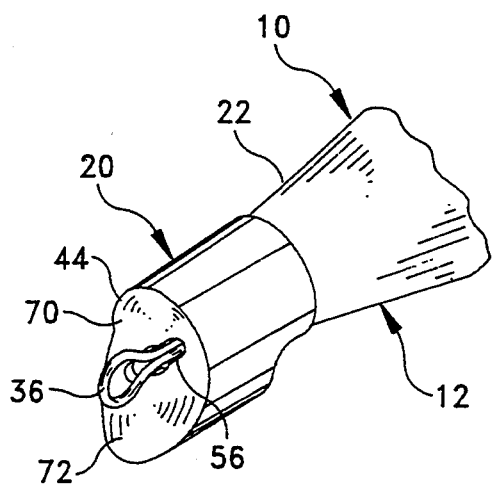

Referring now to the drawings, the fishing lure assembly of the instant invention is illustrated and generally indicated at 10 in FIGS. 1-10. As will hereinafter be more fully described, the instant fishing lure assembly 10 includes a body portion generally indicated at 12, and four interchangeable head portions generally indicated at 14 (FIGS. 1-7), 16 (FIG. 8), 18 (FIG. 9) and 20 (FIG. 10). Each of the head portions 14, 16, 18, and 20 have different end surfaces for creating different movements of the fishing lure assembly 10 as it is moved through the water. The body portion 12 is generally
} cylindrical in shape and it includes a head end 22, a tail end 24, and a cylindrical neck 26 (FIG. 3) extending outwardly from the head end 22. The body portion 12 further includes a first hook eyelet 28 and treble hook 30 at the tail end 24, a second hook eyelet 32 and treble hook 34 at a center portion of the body 12, and a leader eyelet 36 extending outwardly from a terminal end of the neck 26 for attachment of a fishing line or leader (not shown). The neck 26 includes a bayonet slot 38 (FIG. 3), and the bayonet slot 38 has a perpendicular lock portion 40 which extends around the neck 26 in a clockwise direction. The first head portion 14 has a first end 42 and an opposite second end 44, and a vertical centerline indicated at dotted line in FIG. 7 at 46 extending through the vertical orientation of the first head portion 14. Extending through the first end 42 of the head portion 14 is a cylindrical bore 48 (FIG. 3) which has an inner end 50 and an outer end 52. The outer end 52 of the bore 48 includes a rib element 54 which is located inwardly of the bore 48 and adjacent to the outer end 52. The inner end 50 of the bore 48 includes a elongated aperture 56 which extends through to the second end 44 of the head portion 14. The second end 44 of the head portion 14 has a downwardly inclined concave surface 58.

Figure 1:
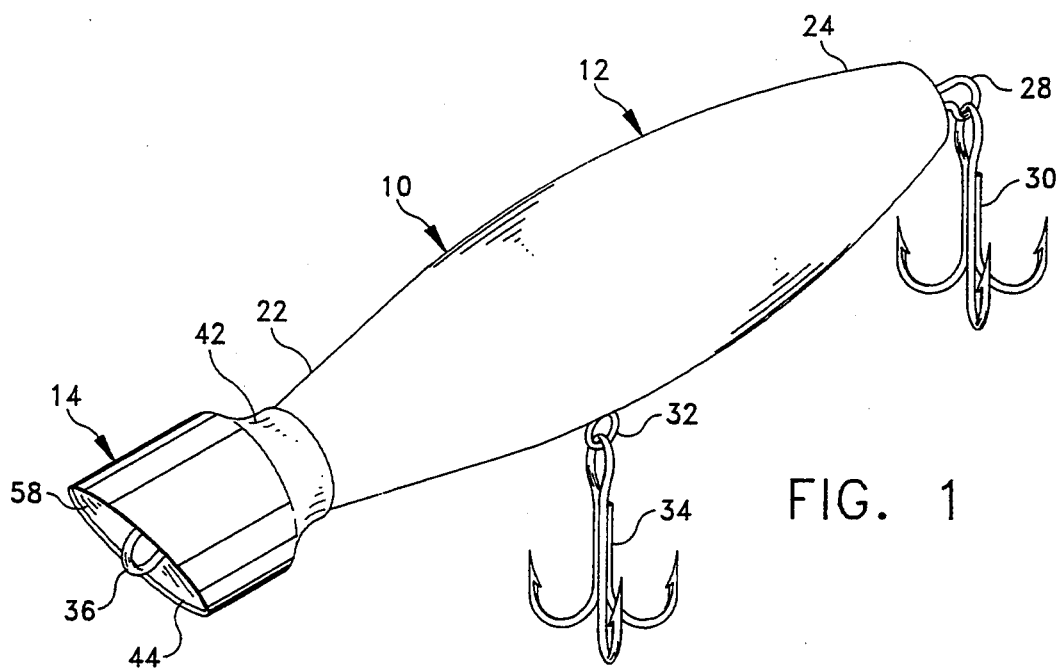
FIG. 1 is a perspective view of the instant fishing lure assembly with a first head portion mounted on the body portion.
Figure 2:
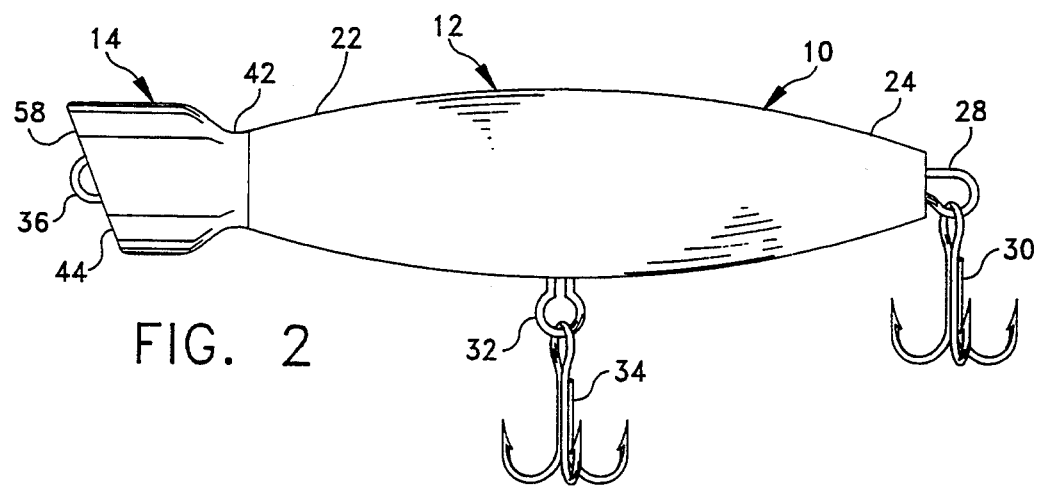
FIG. 2 is a side view thereof.
Figure 3:
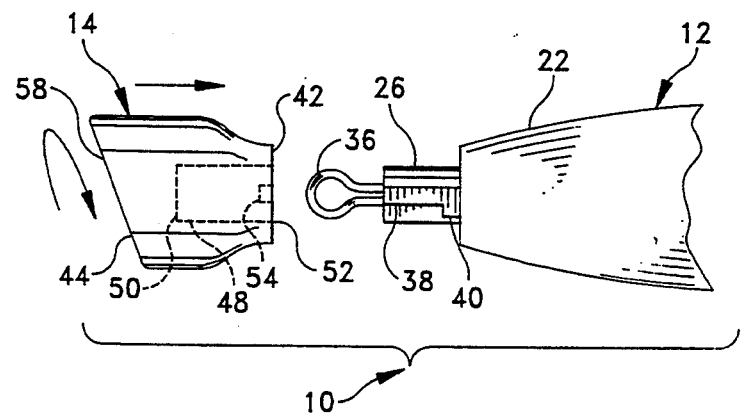
FIG. 3 is another side view thereof with the first head portion disassembled from the body portion.
Figure 4:
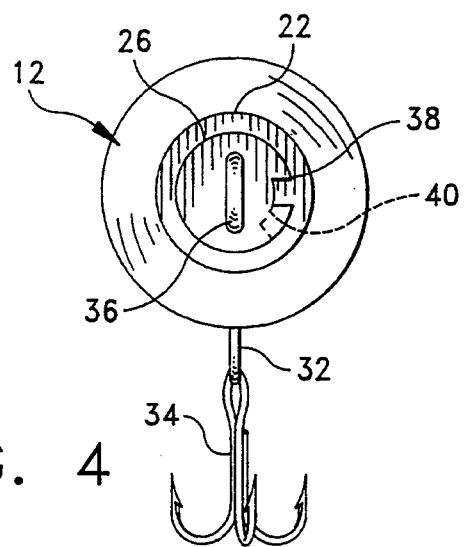
FIG. 4 is an end view of the body portion of the fishing lure.
Figure 5:
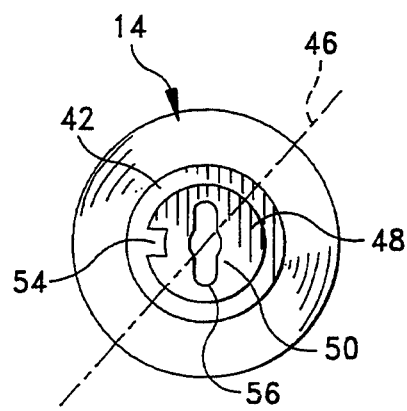
FIG. 5 is an end view of the first head portion of the fishing lure.
Figure 6:
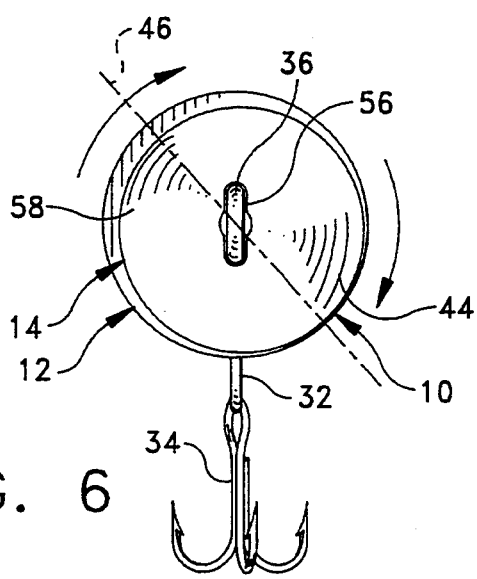
FIG. 6 is an end view with the first head portion slidably received over the neck of the body portion.
Figure 7:
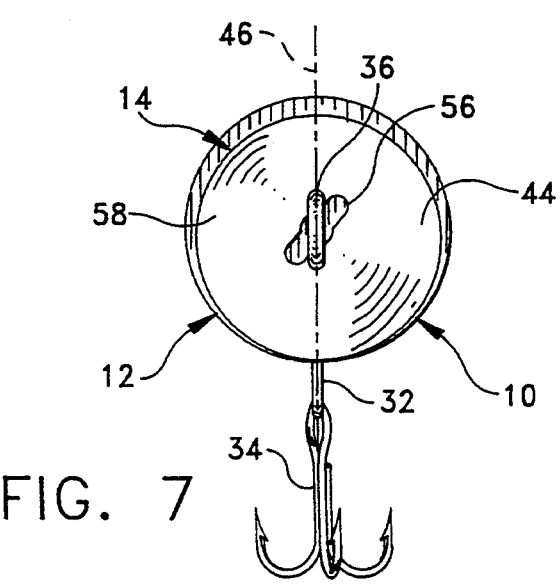
FIG. 7 is another end view with the first head portion rotated into locking engagement with the body portion.

In use, the neck 26 of the body portion 12 is slidably received into the bore 48 of the head portion 14 wherein the rib element 54 is slidably received into the bayonet slot 38 and the leader eyelet 36 extends through the elongated aperture 56 in the bore 48 so as to extend outwardly from the second end 44 of the head portion 14 (FIG. 6). The head portion 14 is then rotatable (FIG. 7) in a clockwise direction with respect to the neck 26 for releasably engaging the head portion 14 and the body portion 12 in assembled relation, wherein the rib element 54 is rotated into locking engagement with the lock portion 40 of the bayonet slot 38. It is pointed out that the rib element 54 and the elongated aperture 56 are rotationally offset by an amount equal to the length of the bayonet lock 40 so that when the head portion 14 is slid onto the neck 26, the vertically extending leader eyelet 36 passes through the elongated aperture 56 (FIG. 6), and so that when the head portion 14 is rotated into assembled position (FIG. 7), the inclined second end surface 58 is moved into proper rotational alignment. Disassembly of the head portion 14 from the body portion 12 is accomplished by rotating the head portion 14 counterclockwise and slidably withdrawing the neck 26 from the bore 48. It is further pointed out that the leader eyelet 36 extends completely through the head portion 14 so that the head portion 14 can be rotated without interference from the loop portion of the leader eyelet 36.

In the use of the lure, the instant head portion 14 is operative for causing a popping or jumping movement of the fishing lure assembly 10 as it is moved through the water.

Referring now to FIGS. 8-10, the second, third and fourth head portions 16, 18 and 20 are illustrated and respectively indicated. While the second, third and fourth head portions 16, 18 and 20 are not illustrated in exploded assembly views, it is to be understood that each of the head portions includes the same cylindrical bore 48, rib element 54 and elongated aperture 56 so that they may all be interchangeably mounted onto the neck 26 of the body portion 12. The second end 44 of the second head portion 16 (FIG. 8) includes an upwardly inclined concave surface 60 having a symmetrical flow splitter 62 aligned along the vertical centerline. In use of the lure, the second head portion is operative for causing a swimming, or back and forth movement of the fishing lure assembly 10 as it is moved through the water. The second end 44 of the third head portion 18 (FIG. 9) has concave surface 64 with a downwardly inclined upper portion 66, and an upwardly inclined lower portion 68. In use of the lure, the third head portion 18 is operative for causing a popping or jumping movement of the fishing lure assembly 10 is it is moved through the water. The second end 44 of the fourth head portion 20 (FIG. 10) has a flat downwardly inclined upper portion 70, and a flat upwardly inclined lower portion 72. In use of the lure, the fourth head portion 20 is operative for causing a darting movement of the fishing lure assembly 10 as it is moved through the water.

It can therefore be seen that the instant invention provides a novel fishing lure assembly 10 having different interchangeable heads 14, 16, 18 and 20 for causing different movements of the lure assembly 10 as it is moved through the water. The leader eyelet 36 of the lure 10 is permanently attached to the neck 26 of the body portion 12 and it extends through a elongated aperture 56 in the head portion 14, 16, 18 or 20 when the body and head portions are assembled. The neck 26 of the body portion 12 includes a bayonet slot 38, and the head portions each include a bore 48 and rib element 54 wherein the neck 26 of the body portion 12 is slidably received into the bore 48, and the head and body portions are rotated relative to each other into assembled relation. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A fishing lure assembly comprising:
a body portion having a head end, a tail end, a center portion extending between said head and tail ends, a vertical centerline and a cylindrical neck extending outwardly from said head end, said neck having a bayonet slot formed therein, said bayonet slot being offset from said vertical centerline by predetermined angle of rotation, said bayonet slot having a perpendicular lock portion adjacent said body portion, said neck further having a first leader eyelet extending outwardly from a terminal end thereof for attachment to a fishing line, said body portion further including a second Leader eyelet at said tail end and a third leader eyelet extending downwardly from said center portion in alignment with the vertical centerline of said body portion, each of said second and third leader eyelets having a respective hook attached thereto;
a head portion having a cylindrical bore in a first end thereof, said head portion further having a contoured second end operable for causing a predetermined movement of said lure assembly when said lure assembly is moved through the water, said contoured second end having a predetermined vertical orientation, said head portion further having a vertical centerline extending through said vertical orientation, said bore having inner and outer ends and a rib element at said outer end, said rib element extending radially inwardly into said bore, said rib element being rotationally offset from said vertical centerline by an angle equal to said predetermined angle of rotation of said bayonet slot plus an angle of rotation of said lock portion of said bayonet slot, said inner end having an aperture therein, said neck portion being slidably receivable into said bore in said head portion wherein said rib element is slidably received into said bayonet slot and said leader eyelet extends through said aperture in said inner end of said bore so as to extend outwardly from said second end of said head portion, said head portion being rotatable with respect to said neck portion for releasably engaging said head portion and said body portion in assembled relation wherein said rib element is rotated into locking engagement with said lock portion of said bayonet slot, said centerline of said head portion being in alignment with said centerline of said body portion when said head portion and said body portion are rotatably engaged.

2. In the fishing lure assembly of claim 1, said lock portion of said bayonet slot extending around said neck portion in a clockwise direction.

3. In the fishing lure assembly of claim 1, said second end of head portion lure having a downwardly inclined concave surface.

4. In the fishing lure assembly of claim 1, said head portion having a vertical centerline, said second end of said head portion having two upwardly inclined concave surfaces which are symmetrical on opposing sides of said vertical centerline.

* * * * *